(No Model.) 4 Sheets—Sheet 1.
J. SILVERTOOTH.
COMBINED SEED PLANTER, HARROW, AND CULTIVATOR.
No. 426,689. Patented Apr. 29, 1890.
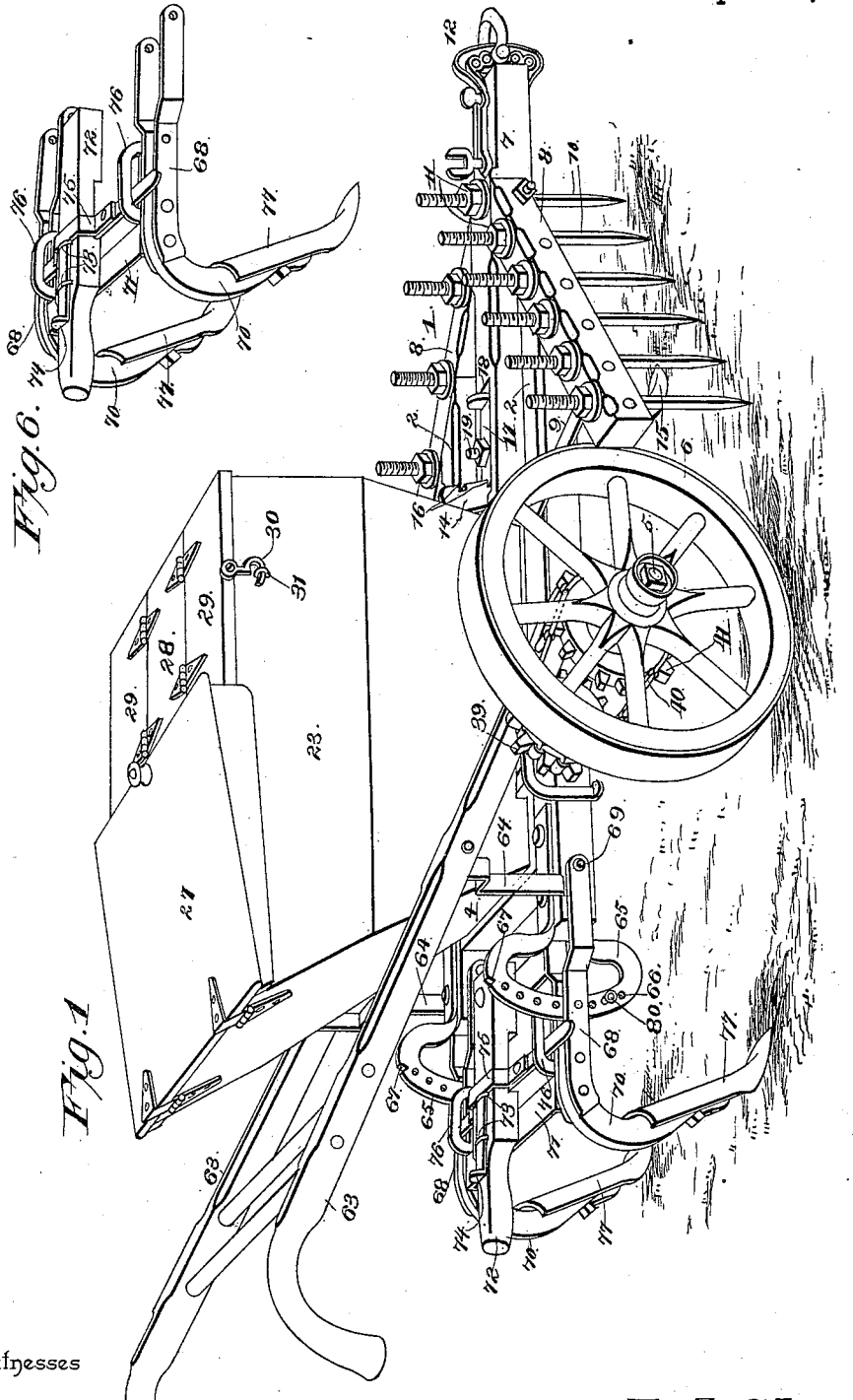
Witnesses
M. Fowler
Wm. Bagger
Inventor
Jacob Silvertooth
By his Attorneys,
C. A. Snow & Co.

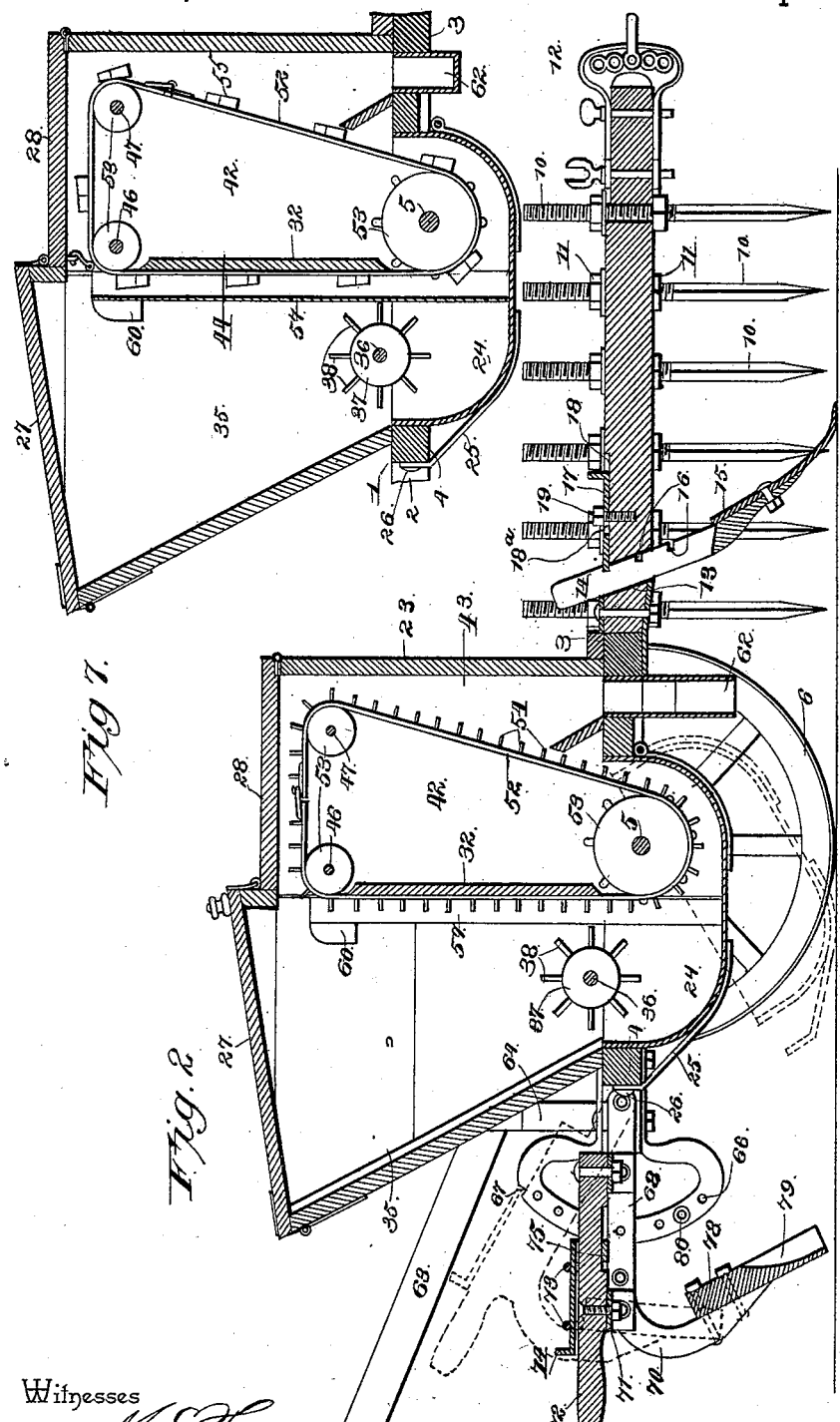

(No Model.) 4 Sheets—Sheet 3.
J. SILVERTOOTH.
COMBINED SEED PLANTER, HARROW, AND CULTIVATOR.
No. 426,689. Patented Apr. 29, 1890.
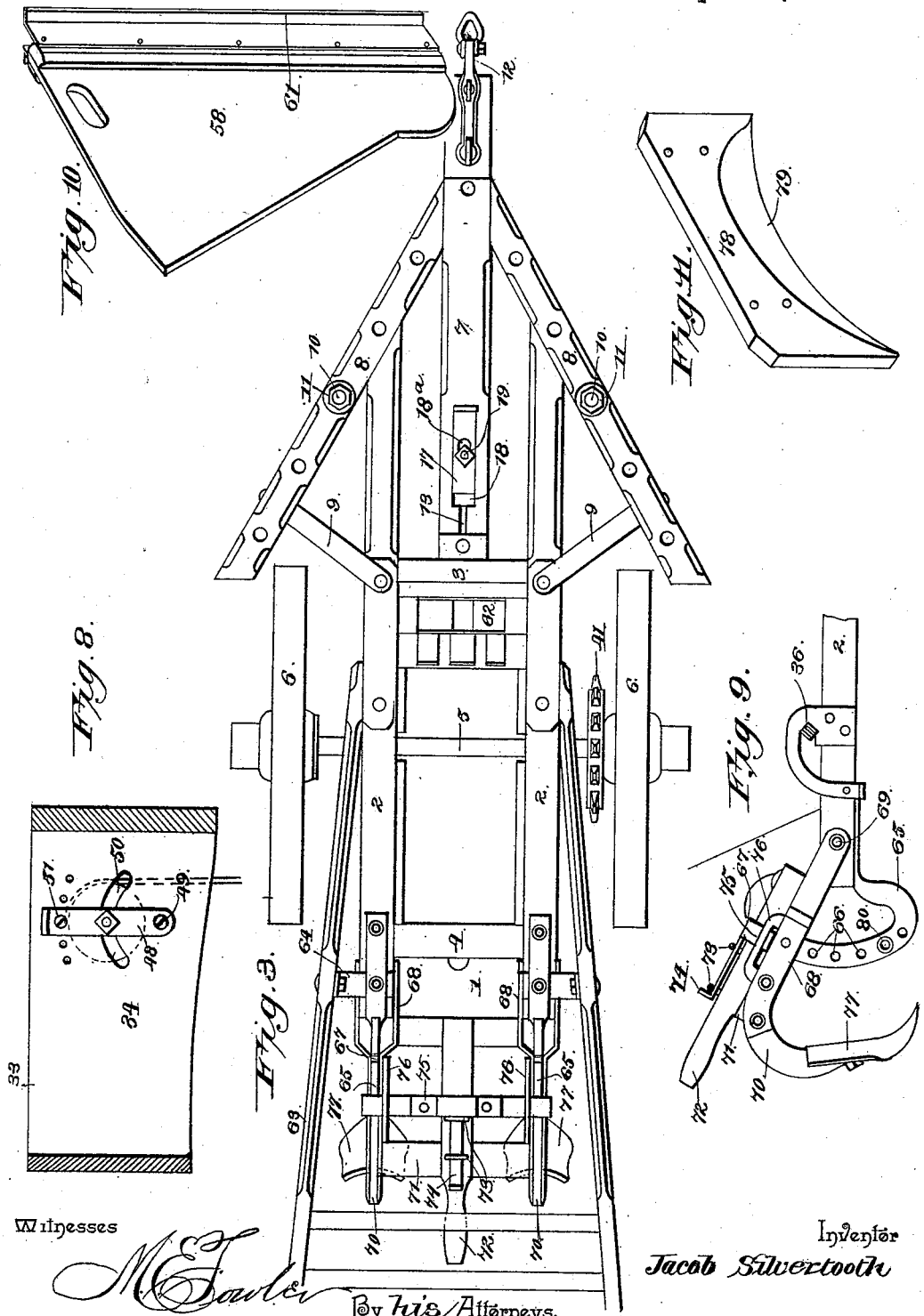
Witnesses
M. Fowler
Wm. Bagger
Inventor
Jacob Silvertooth
By his Attorneys,
C. A. Snow & Co.

(No Model.) 4 Sheets—Sheet 4.
J. SILVERTOOTH.
COMBINED SEED PLANTER, HARROW, AND CULTIVATOR.
No. 426,689. Patented Apr. 29, 1890.
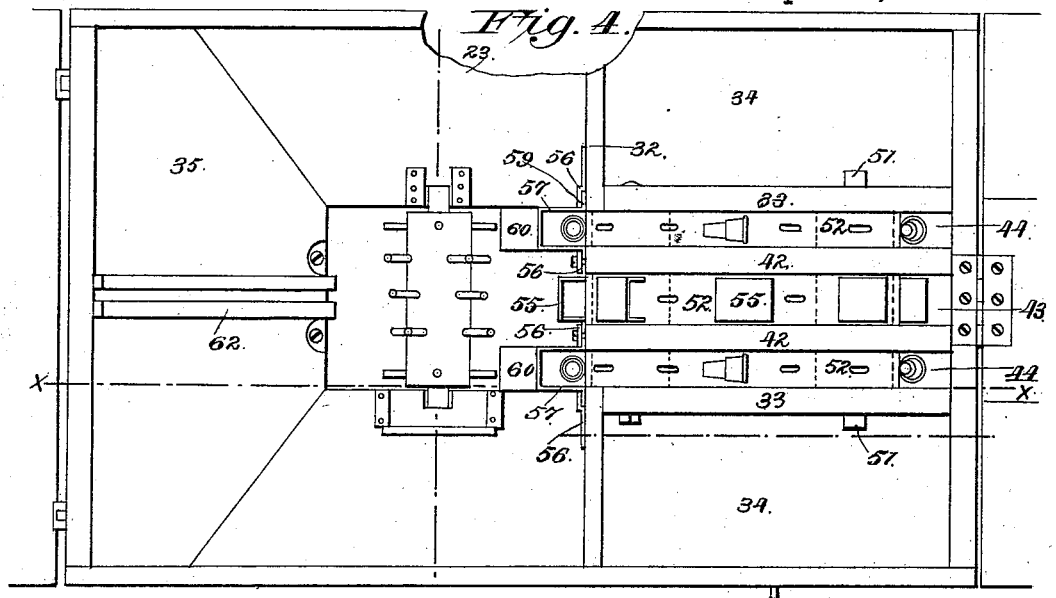
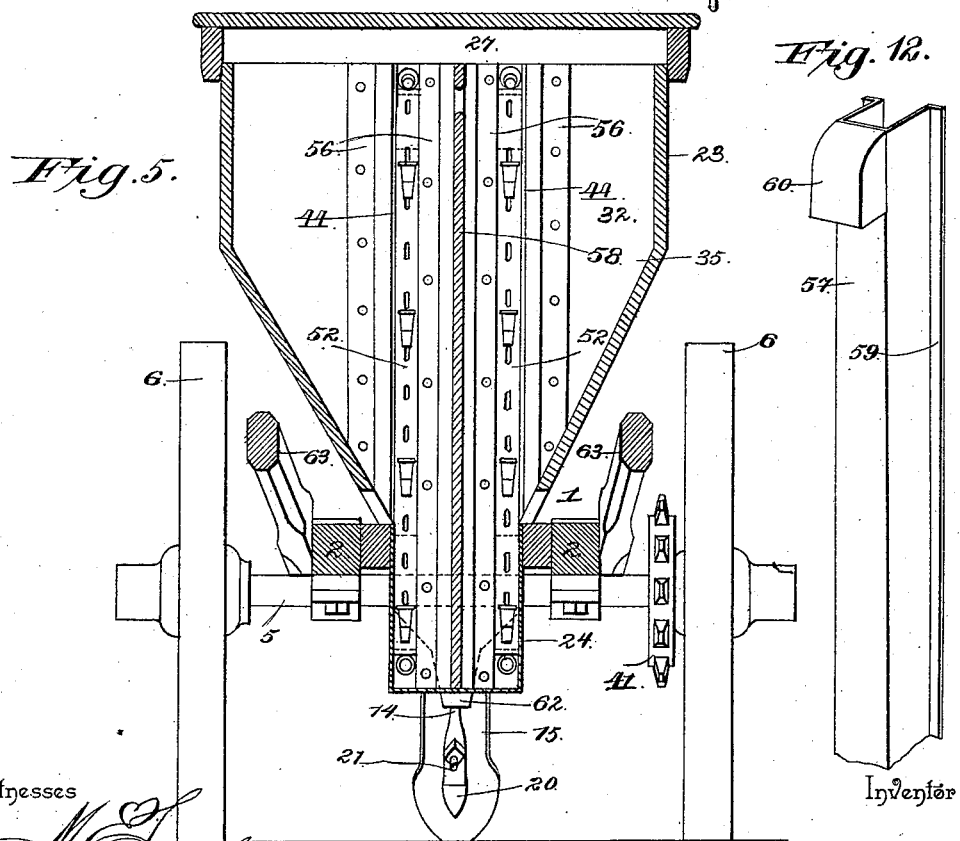
Witnesses  Inventor
Jacob Silvertooth
By his Attorneys,

UNITED STATES PATENT OFFICE.

JACOB SILVERTOOTH, OF FULTON, KENTUCKY.

COMBINED SEED-PLANTER, HARROW, AND CULTIVATOR.

SPECIFICATION forming part of Letters Patent No. 426,689, dated April 29, 1890.

Application filed August 16, 1889. Serial No. 320,938. (No model.)

*To all whom it may concern:*

Be it known that I, JACOB SILVERTOOTH, a citizen of the United States, residing at Fulton, in the county of Fulton and State of Kentucky, have invented a new and useful Combined Seed-Planter, Harrow, and Cultivator, of which the following is a specification.

This invention relates to an improved combined seed-planter, harrow, and cultivator; and it has for its object to provide a machine of this class which shall be simple in construction, durable, and inexpensive, and which may be used for planting cotton, corn, or peas, and which may be easily and quickly converted into a harrow or cultivator.

The invention consists in the improved construction, arrangement, and combination of parts, which will be hereinafter fully described, and particularly pointed out in the claims.

In the drawings hereto annexed, Figure 1 is a perspective view of my improved combined seeder, harrow, and cultivator. Fig. 2 is a longitudinal vertical section of the same. Fig. 3 is a top view showing the device converted into a cultivator, the seeding mechanism having been removed. Fig. 4 is a top view showing the seed box or hopper and the seeding mechanism, a cotton-planting device of a slightly modified construction having been introduced. Fig. 5 is a vertical transverse sectional view taken through the hopper, the device being arranged for planting corn and peas. Fig. 6 is a perspective detail view of the covering-plows. Fig. 7 is a longitudinal vertical sectional view taken on the line $x$ $x$ in Fig. 4. Fig. 8 is a detail view of the mechanism for tightening the endless belt of the seeding mechanism. Fig. 9 is a detail side view of the covering-plows, showing the said plows in a raised position. Fig. 10 is a perspective detail view of the detachable partition used in the seed-box of my improved seeding-machine. Fig. 11 is a perspective detail view of the cotton-covering device. Fig. 12 is a detail view of one of the sliding caps.

Like numerals of reference indicate like parts in all the figures.

1 designates a suitably-constructed frame comprising the side pieces 2 2 and cross-pieces 3 and 4, connecting the said side pieces near the front and rear ends, respectively.

5 designates the axle, which is journaled in boxes upon the under side of the frame, and which is mounted upon the supporting-wheels 6 6.

7 designates a beam or tongue secured centrally to the front cross-piece of the frame and extending forwardly between the front ends of the side beams 2 2.

8 8 are the harrow-beams, which are secured to the front end of the tongue 7, whence they diverge in a rearward direction, being secured to the front ends of the frame-beams 2 2, and connected with the latter by braces 9. In the said harrow-beams and in the tongue 7 are mounted the vertical harrow-teeth 10, which are provided with screw-threaded shanks, upon which clamping-nuts 11 are adjusted above and below the said harrow-beams, so as to provide for the vertical adjustment of the teeth. A draft-clevis 12 is attached in the usual manner to the front end of the tongue.

The tongue is provided near its rear end with a vertical slot 13 to receive the shank 14, carrying at its lower end the furrow-opener 15.

The shank 14 is provided with a series of notches 16, any one of which is adapted to receive a longitudinally-sliding latch-plate 17, mounted in a recess 18 in the upper side of the tongue and provided with a longitudinal slot 18ᵃ to receive a bolt 19, by means of which the said latch-plate may be secured in engagement with any one of the notches in the shank of the furrow-opener. It will be seen that by loosening the bolt 19 the latch-plate may be withdrawn and the shank of the furrow-opener adjusted to any desired point, where it may be secured by restoring the latch-plate and tightening the bolt.

The lower end of the shank of the furrow-opener is flattened and pointed, so as to form a small bull-tongue 20, (shown in Fig. 5 of the drawings,) and having a perforation to receive the bolt 21, by means of which the furrow-opener or shovel 15 is secured in position.

When desired, the shovel 15 may be detached, and the bull-tongue 20, or flat point of the shank, (shown in Fig. 5 of the drawings,) will then serve to open a narrow furrow, which is more desirable for certain purposes.

23 designates a seed box or hopper, which is mounted in the frame in such a manner that it may be detached therefrom when desired. The bottom of the seed-box is formed by a semi-elliptical box 24, hinged detachably to the under side of the frame and having a latch 25, adapted to engage a suitable catch 26 upon the rear cross-bar of the frame.

The hopper is provided with covers 27 and 28, hinged, respectively, to its rear and front edges, and to the sides of the cover 28 are hinged sub-covers 29, the edges of which may be connected with the sides of the hopper-casing by means of hooks and staples 30 and 31.

The seed box or hopper is provided with a vertical transverse partition 32, and the forward one of the compartments thus formed has longitudinal partitions 33 33, at the outer sides of which are formed the tool-boxes 34, which are closed by the sub-covers 29. The rear compartment 35 of the hopper, which forms the main seed-compartment, is provided with bearings for a transverse shaft 36, carrying a drum 37, provided with radially-extending fingers or agitators 38. The outer end of the drum-shaft 36 has a sprocket-wheel 39, which may be connected by a chain 40 with a sprocket-wheel 41, secured upon the hub of one of the transporting-wheels of the machine. These parts are so arranged that by loosening the sprocket-wheel 39 the shaft 36 may be withdrawn, so as to admit of the removal of said sprocket-wheel, after which the shaft 36 may be withdrawn from the drum 37, which is merely feathered thereon, after which the said drum may be removed.

Inasmuch as the drum 37 is only used when the device is employed as a cotton-planter it is necessary that it should be rendered detachable, as described, and it will be seen that by arranging the parts in the manner set forth the said drum may be easily and quickly removed or restored.

The central forward compartment of the seed-box is subdivided by partitions 42 into sub-compartments 43 44 44. At or near the bottom, and at or near the upper corners of the said compartments, are mounted the transverse shafts 5, 46, and 47, the former of which is the axle of the machine, and at the outer ends of which latter are journaled in levers 48, pivoted at 49, to the outer sides of the partitions 33, which latter are provided with segmental slots 50 for the passage of said shafts. The free ends of the levers 48 may be adjusted to various positions by means of screws 51, for the purpose of tightening the belts or bands 52, which pass over pulleys 53, mounted upon the several shafts, and which pass over the rear side of the vertical transverse partition 32, the lower end of which is provided with an opening for the passage of the said belts.

The belt 54, which works in the central compartment 43, is provided either with outwardly-extending fingers 54, as shown in Fig. 2 of the drawings, or with a series of suitably-constructed buckets 55, as shown in Fig. 4. Either of these devices is adapted for the planting of cotton-seeds, the difference being that when the device shown in Fig. 2 is used the planting will be continuous, while, when the buckets shown in Fig. 4 are used, the seed will be dropped some distance apart. In the latter case I avoid the use of cotton-choppers for the purpose of thinning out the growing crop. By either of these devices the seed may be planted as it comes from the gin without first rolling it in dirt for the purpose of packing the lint, as is necessary with most planters of ordinary construction.

The belts 52 running in the compartments 44 44 are provided with suitably-constructed buckets at the desired distances apart for the purpose of planting corn or peas. When it shall not be desired to plant corn and peas together, but in alternate hills, each alternate seed-cup may be removed from the two belts.

Suitably secured to the rear side of the transverse partition 32 are the cleats 56, adapted to receive the two vertical sliding caps 57 and a vertically-sliding partition 58. The said sliding caps are provided with flanges 59, adapted to engage the said cleats, and they are of sufficient length and proper dimensions to inclose that portion of the seed-belts 52 working in the compartments 54, which extend over the rear side of the vertical transverse partition 32. The said caps, which are provided at their upper ends with handles 60, extend entirely to the bottom of the swinging hopper 24, thus completely cutting off the belts 52, working in the compartments 44, from the seed-compartment 35 of the hopper. These caps are placed in position when the device is to be used as a cotton-planter, as shown in Figs. 2 and 4 of the drawings.

When the device is to be used for the purpose of planting corn and peas, the caps 57 are removed, and I substitute in lieu thereof the partition 58, which is provided with flanges 61, adapted to engage the central cleats 56 and to completely cover the cotton-planting belt and cut the latter off from communication with the seed-compartment of the hopper. The rear edge of the partition 58 is adapted to fit between a pair of cleats 62 upon the rear side of the seed-compartment, and the lower side of the said partition is adapted to fit snugly in the bottom of the hopper. The said partition thus serves not only to prevent the seed from having access to the cotton-planting belt, but it also divides the seed-compartment of the hopper into two chambers, in which corn and peas, respectively, may be placed without getting mixed.

It is obvious that when it shall be desired to plant corn or peas alone one of the caps 57 may be used for the purpose of covering one of the seed-belts.

When the machine is to be changed from planting one kind of seed to another, the seed which remains in the hopper may be readily removed by opening the hinged lower portion 24 of the said hopper without danger of leaving any behind to become mixed up with the new seed which is to be placed in the hopper. The bottom of the hopper is provided near its front end with the downwardly-extending chute 62, for the purpose of conveying the seed to the ground as it is being delivered from the respective seed-belts.

My improved seeding-machine is provided with handles 63, the lower ends of which are suitably attached to the frame, with which the said handles are furthermore connected by braces 64. The rear ends of the side beams of the frame are provided with segmental brackets 65, having transverse perforations 66, and the upper ends of which are provided with notches 67. The bifurcated beams 68 of the coverers are mounted pivotally upon the rear ends of the frame-beams by means of transverse bolts 69, and to the rear ends of the said beams are attached the standards 70. The beams 68 are connected by transverse braces 71, to which a handle of suitable construction is secured. The upper side of the handle is provided with staples 73 for a longitudinally-sliding latch 74, the front end of which is provided with transverse arms 75, extending through and guided in brackets 76, which are secured to the inner sides of the beams 68. The standards 70 may be provided with covering-shovels 77 of the construction shown in Fig. 1 of the drawings; or the said shovels may be detached, and in their place may be arranged a covering board or drag 78, having a concaved lower edge 79, as shown in Fig. 11 of the drawings. It will be seen that by the construction and arrangement of parts just described the frame comprising the beams carrying the coverers may be raised until the arms 75 of the latch 74 may be thrown into engagement with the notches 67 at the upper ends of the segmental frames 65. When the covering device is thus thrown out of operation, the machine may be tilted upon the supporting-wheels, so as to raise the harrow and furrow-opener out of the ground, when the machine may be easily turned at the end of the row.

To regulate the distance to which the coverers may enter the ground, bolts 80 may be passed transversely through the perforations 66 in the frame 65, thereby preventing the beams of the coverers from dropping below a certain point.

The operation and advantages of this invention will be readily understood from the foregoing description, taken in connection with the drawings hereto annexed.

When the seed box or hopper is in position upon the frame, the machine may be used for planting either cotton or corn and peas by simply adjusting in position either the caps 57 or the partition 58 and changing the covering device to correspond.

By removing the front harrow-teeth, or, if necessary, the three front teeth and the furrow-opener, the device is converted into a cultivator adapted to straddle the rows of growing plants. When thus used, I also prefer to remove the seed box or hopper, as will be seen in Fig. 3 of the drawings.

By replacing the front harrow-teeth the device may be used for cultivating between rows.

The general construction of the machine is simple and inexpensive, and its operation and advantages will be readily appreciated by those skilled in the art to which it appertains.

Having thus described my invention, what I claim, and desire to secure by Letters Patent, is—

1. The combination, with the hopper having the transverse partition, of a series of seed-belts mounted upon rollers in the front compartment and running over the rear side of the transverse partition, which is provided at its lower end with slots for the passage of said belts, and vertically-sliding caps adapted to be mounted upon the rear side of the said partition to cover the said belts, substantially as and for the purpose set forth.

2. The combination of the hopper having the transverse partition provided with slots at its lower end and with vertical cleats, the rollers journaled in the front compartment of the hopper, the seed-belts mounted upon said rollers and passing over the rear side of the partition, and the vertically-sliding detachable caps having laterally-extending flanges adapted to engage said cleats, substantially as and for the purpose set forth.

3. The combination, with the hopper having the transverse partition, the rollers journaled in the front compartment of said hopper, and the seed-belts mounted upon said rollers and passing over the rear side of the partition, of cleats mounted upon the rear side of said partition adjacent to the central seed-belt, and a partition-plate having flange adapted to engage the said cleats, so as to form a cover for the central seed-belt, said partition-plate being extended to the bottom and rear side of the hopper, which latter is provided with cleats to hold it securely in position, substantially as set forth.

4. The combination, with the hopper having the transverse partition and partitions extending longitudinally between said transverse partition and the front end of the hopper and provided with segmental slots and pivoted arms, of the roller-shafts mounted in the said longitudinal partitions and pivoted arms, the seed-belts passing over the said rollers and over the rear side of the transverse partition, and set-screws for securing the pivoted arms in position to tighten the seed-belts, substantially as set forth.

5. The combination of the hopper having the transverse partition, the longitudinal partitions connecting the latter with the front end of the hopper, the transverse shafts mounted in said partitions and carrying the seed-belts which pass over the rear side of the transverse partition, the supplemental partitions separating said seed-belts, the discharge-spout, the covers hinged to the rear and front edges of the hopper, and the covers hinged to the sides of the front cover and covering the spaces formed between the outer longitudinal partitions and the sides of the hopper, substantially as set forth.

6. The combination of the hopper, the transverse partition having slots at its lower end, the roller-shafts journaled in the front compartment, the seed-belts passing over the rear side of the transverse partition, the cleats on the rear side of the latter, the detachable caps covering the seed-belts at the outer side, and the shaft mounted transversely in the rear compartment of the hopper and having a drum provided with radially-extending fingers or agitators, substantially as set forth.

7. The combination of the frame, the segmental brackets at the rear end of the same, the bifurcated beams mounted upon the rear ends of the frame-beams and straddling the segmental brackets, bolts adjustable in transverse perforations of the latter, and the coverers secured to standards attached to the rear ends of the said pivoted beams, substantially as set forth.

8. The combination of the frame, the segmental brackets at the rear end of the same having notches at their upper ends, the bifurcated beams pivoted to the rear ends of the frame-beams and straddling the segmental brackets, the coverers attached to standards at the rear ends of said pivoted beams, the braces connecting the latter, a handle mounted upon said braces, and a longitudinally-sliding latch mounted upon said handle and having laterally-extending arms guided in slotted brackets attached to the pivoted beams, and adapted to engage the notches at the upper ends of the segmental brackets, substantially as and for the purpose herein set forth.

In testimony that I claim the foregoing as my own I have hereto affixed my signature in presence of two witnesses.

JACOB SILVERTOOTH.

Witnesses:
W. H. BROOKS,
R. E. STILLEY.